June 1, 1926.
W. G. WILSON
VALVE
Filed March 27, 1925
1,587,055
4 Sheets-Sheet 1
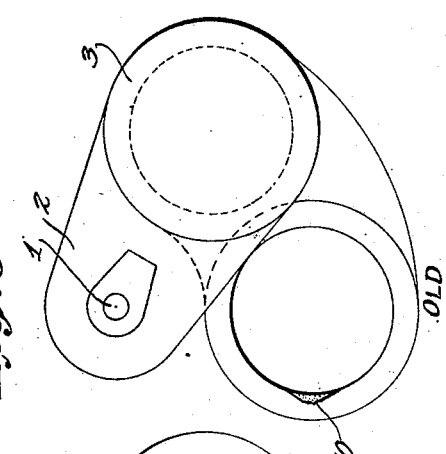
Fig. 1
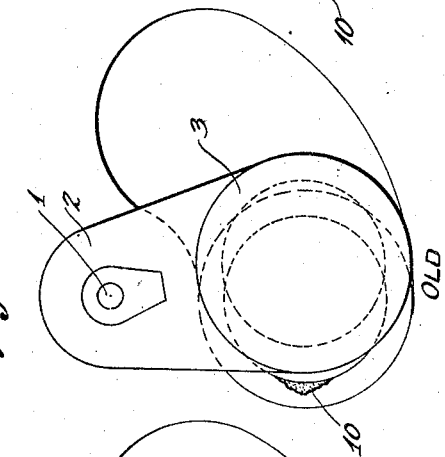
Fig. 3
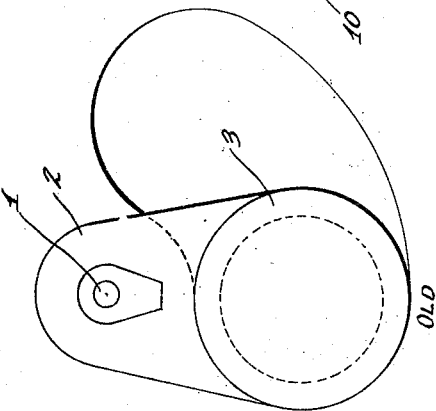
Fig. 5
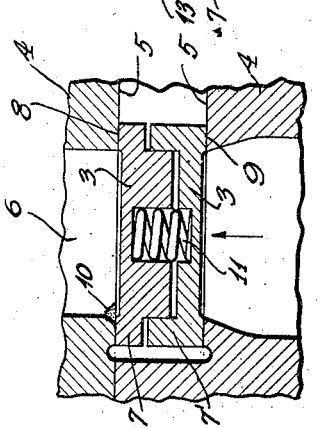
Fig. 2
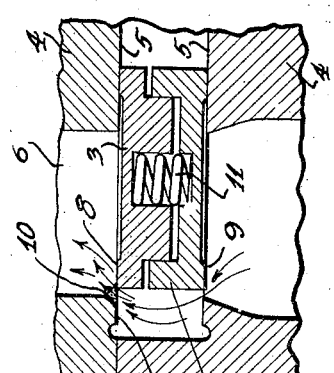
Fig. 4
Fig. 6
INVENTOR.
Wylie G. Wilson
BY James L. Stewart
ATTORNEYS.

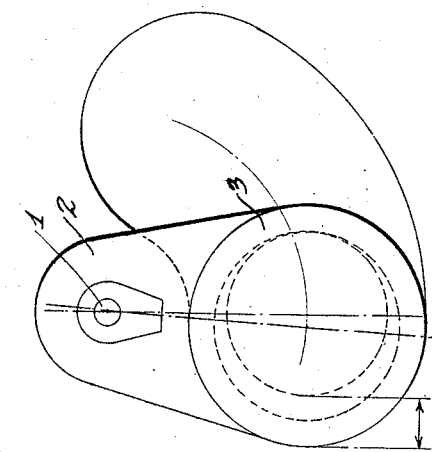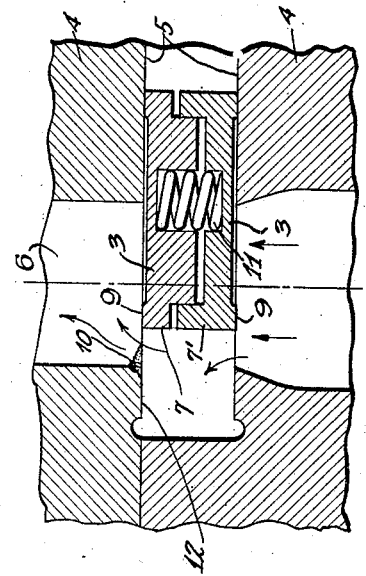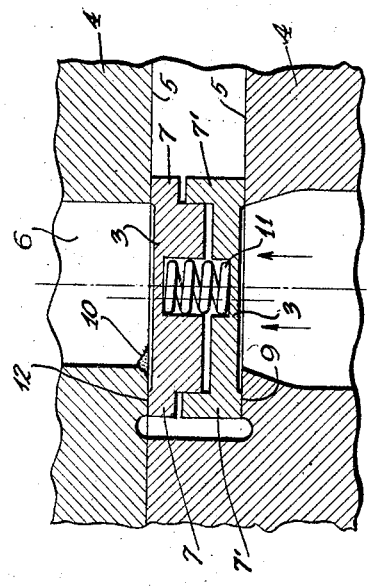

June 1, 1926.

W. G. WILSON 1,587,055

VALVE

Filed March 27, 1925    4 Sheets-Sheet 3

INVENTOR.
Wylie G. Wilson
BY James L. Stewart
ATTORNEY

June 1, 1926.

W. G. WILSON

VALVE

Filed March 27, 1925

INVENTOR.
Wylie G. Wilson
BY James L. Stewart
ATTORNEYS.

Patented June 1, 1926.

1,587,055

UNITED STATES PATENT OFFICE.

WYLIE G. WILSON, OF JERSEY CITY, NEW JERSEY, ASSIGNOR TO EVERLASTING VALVE COMPANY, A CORPORATION OF NEW JERSEY.

VALVE.

Application filed March 27, 1925. Serial No. 18,719.

This invention relates to an improvement in valves and has for its specific object the providing of means to compensate for abrasion to the valve seat or to the sealing element in the operation of a valve.

The class of valves to which this invention relates comprises more particularly what are know as gate valves wherein a valve casing is provided, having a port therethrough, and a sealing face circumferential of the port, with a sealing element adapted to cooperate with said sealing face to close the port, and means to operate said sealing element in relation to the said sealing face.

It has been observed that in the operation of such a valve, particularly in the act of opening or closing the same, a crescent-shaped aperture is formed between the periphery of the port and the sealing element just prior to the opening or closing of the valve. When the liquid under control by the valve is of an abrasive nature, carrying particles of sand or grit liable to occasion abrasion, abrasion of the valve seat and of the sealing element is liable to occur at the instant when this crescent-shaped aperture is being opened or closed. The force of the liquid carrying such abrasive substances operates to cut or abrade the sealing face adjacent the periphery of the port, and also in like manner, the periphery of the sealing element which cooperates with the sealing face to accomplish a seal.

In many valve constructions of this nature the sealing element is mounted for arcuate movement and also for rotation on its axis. It is observed that such arcuate movement causes the sealing element to rotate on its axis to a limited degree, but sufficient to operate to constantly move the sealing element on its axis, and consequently constantly present a new face to the sealing surface and a new section of its periphery to that portion of the sealing face adjacent the periphery of the port, where the crescent-shaped aperture above referred to occurs, at the moment when the valve is being opened or closed. Consequently there is not the liability of abrasion of the sealing element because of said rotation of the same on its axis, whereas the abrasion, such as it may be, is operating continuously on the sealing face adjacent the periphery of the port, always continuously at or adjacent to the same point, so that at this point abrasion is continuously recurring, to the end that in the course of time the right angular edge of the port at the point of said crescent formation will be eaten away and, when continued, such abrasion will penetrate into the sealing face and beyond the point where a normal sealing element would cover the same,—thus causing leakage and necessitating repair.

It is the purpose of this invention to compensate for such abrasion in the sealing face by extending the same in the same plane as the sealing face for a predetermined dimension so that while the abrasion may continue, the life of the valve will be extended in proportion to the extent of a predetermined dimension of the extended surface.

In order that the sealing element may cooperate with this extended sealing face, such sealing element is made of sufficient size to embrace the port and also the extended sealing face. I prefer to accomplish this result by providing the sealing element with an annular sealing face of greater internal diameter than that which is normally required to embrace the port and make contact with the sealing face immediately circumferential thereof. In other words, I make this annular sealing contact face of sufficient internal diameter so that when the sealing element is moved to a point where it will cover the port and embrace said extended sealing fact, it will be eccentric to the axis of the port.

To accomplish this result, I provide means for moving the sealing element a predetermined distance in its arcuate movement greater than the normal by the predetermined dimension of said extended area of said sealing face, and I provide means for arresting such movement of said sealing element at said predetermined position When the construction contemplated in this invention is practically operated, a pronounced increase in area of sealing face is provided at that point in the seat where said crescent shaped aperture is formed, so as to allow for a considerable amount of abrasion at this point without producing leakage.

The utility of this invention lies in the fact that a valve so constructed will be of much longer life than a valve without this extended area of sealing face, for it will be understood by those skilled in the art that to make a repair to a sealing face which is part of the valve casing requires that the valve casing be dismembered and such abraded surface be repaired or restored, and it is an advantage to be able to postpone such repairs as long as possible, and to construct the valve in a way that will give it longer life; for in many cases such valves are in such a position that to remove and replace the same involves not only the incidental repair, but also interference with other mechanisms which are dependent upon the integrity of such valve for their proper performance.

The invention is illustrated in the accompanying drawings in which the several parts are designated by numerals, like parts being referred to by like numerals.

Figure 1 is a diagrammatic view of a gate valve such as that referred to.

Figure 2 is a section in a plane of the axis of the port of the vlave shown in Figure 1, the same being in closed position.

Figure 3 in like manner is a diagrammatic view, and Figure 4 a section, the difference being that the valve is moved towards open position.

Figure 5 is a diagrammatic view of a valve, and Figure 6 is a section showing the valve open. The foregoing figures are introduced to show the construction of gate valves as commonly formed.

Figure 7 is a diagrammatic view showing the improved valve closed, and Figure 8 is the same showing a vertical section of a valve in the plane of the axis of the port.

Figure 9 is a diagrammatic view and Figure 10 a section, both similar to Figures 7 and 8, with the exception that the latter illustrates the valve as open, whereas the former shows it closed.

Figure 11:
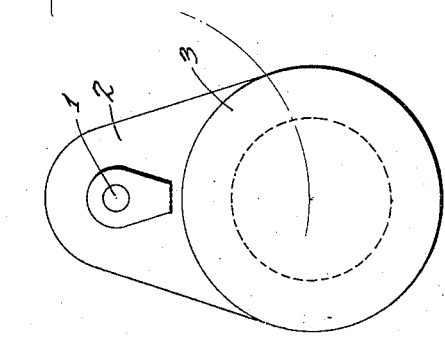

Figure 11 is a diagrammatic view.

Figure 12:
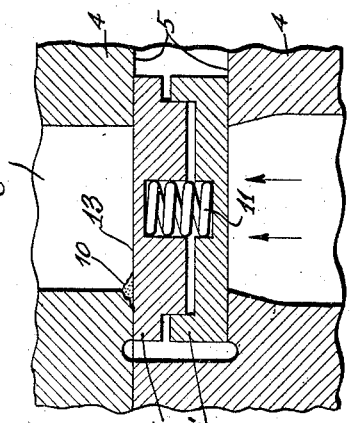

Figure 12 is a section in a plane of the axis of a port showing different construction from that illustrated in previous figures. In the latter the valve is shown closed.

Figure 16:
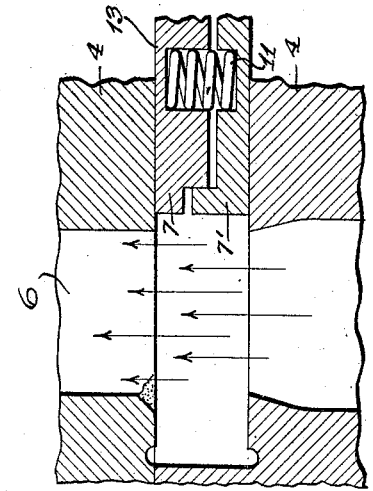
Figure 14:
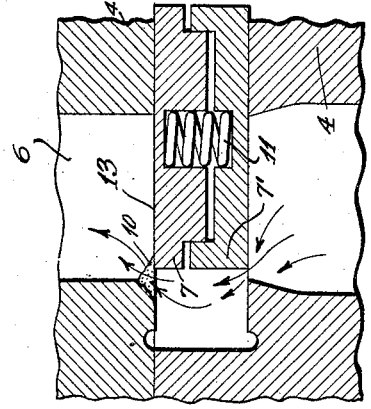
Figure 15:
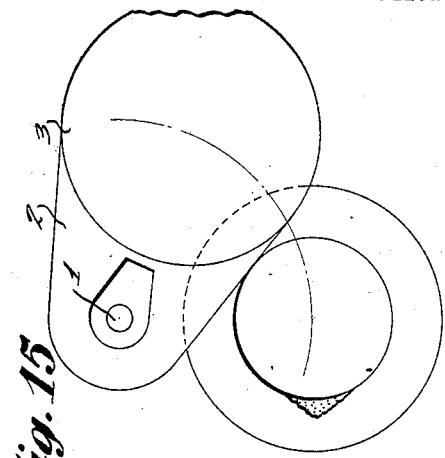
Figure 13:
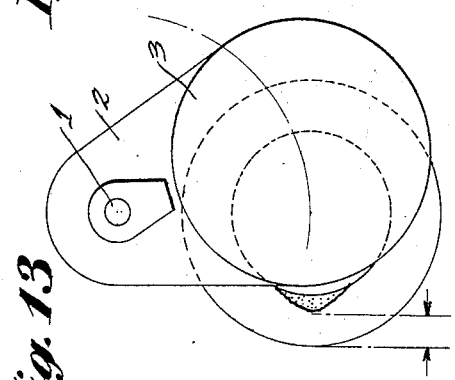

Figures 13 and 14 are the same as Figures 11 and 12, with the exception that the valve is partly open; and Figures 15 and 16 are the same as Figures 11 and 12, with the exception that the valve is shown entirely open. All of the foregoing constructions illustrate a gate valve wherein the sealing element is moved in the arc of a circle.

Figure 17:
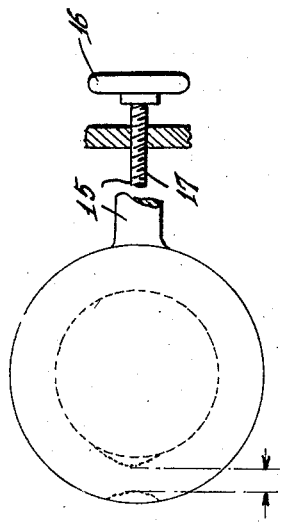

Figure 17 is a diagrammatic view wherein the gate valve is moved in a plane perpendicular to a plane passing through the axis of the port.

Figure 18:
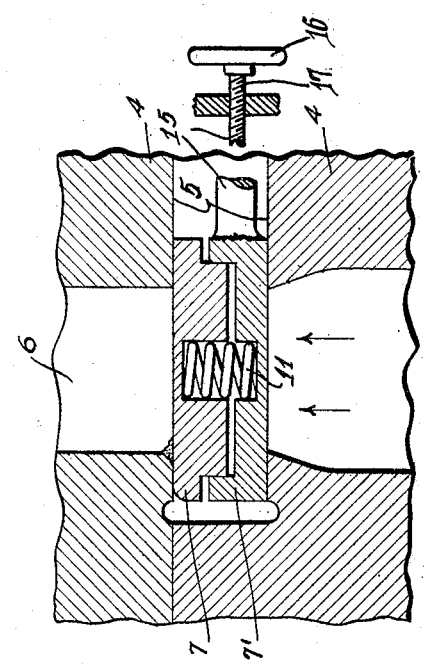

Figure 18 is the same as Figure 17, showing a vertical section in a plane through the axis of a port, the valve in such case being shown as closed.

Figure 19:
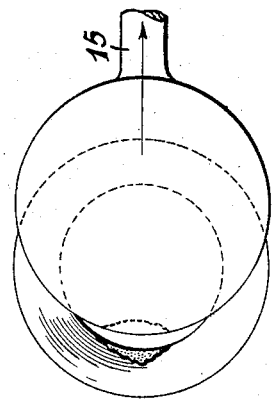
Figure 20:
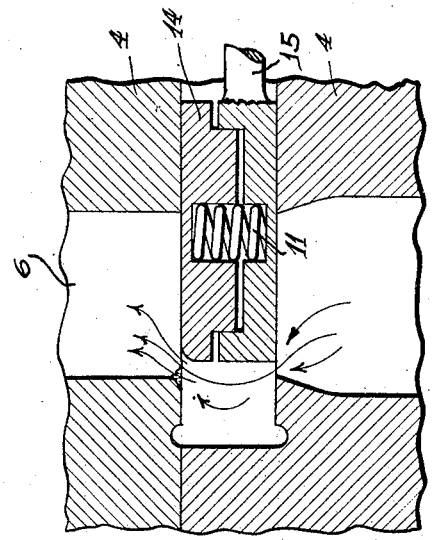

Figures 19 and 20 are the same as Figures 17 and 18, with the exception that the valve is shown partly open.

In all of the drawings, with the exception of Figures 17 to 20, 1 is a pivotal point on which is adapted to rock an arm 2 carrying a sealing element 3. 4 and 4 are the valve casing having the internal sealing face 5. 6 is a port passing through the casing perpendicular to the plane of the sealing face 5. 7 and $7^1$ are two cooperating elements having the spring 11 interposed between them, together forming the sealing element 3 interposed between the faces 5 and 5 of the valve casing, and operated by the pivoted arm 2.

In Figures 1 to 6, inclusive, a valve of usual construction is illustrated and the condition which develops in the operation of such a valve is also illustrated by showing the abrasion which takes place at one point in the periphery of the valve seat or port as indicated at 10. From the drawings, Figures 2 and 4, it will readily be seen that when the sealing element is partly opened, sufficiently to permit the liquid or fluid to pass between such sealing element and a wall of the valve seat, abrasion is liable to occur to the valve seat by reason of the passage of fluid or liquid through such small aperture, because of the fact that such liquid or fluid is liable to carry in suspension therein abrasive particles such as sand or grit which, in the frequent operation of the valve, will cause an abrasion or cutting of the metal, as indicated at the point 10.

In Figures 7 to 10, inclusive, a preferred form of construction is illustrated in which this invention is disclosed. It will be noted in these drawings that the valve face 12 adjacent the point where abrasion takes place, as indicated at 10, is made considerably wider than the corresponding face in Figures 1 to 6 inclusive. In like manner the sealing element comprising the parts 7 and $7^1$ is made of greater diameter than the corresponding sealing elements so that when the valve element is closed, as shown in Figure 8, the sealing elements 7 and $7^1$ overlap the abraded section of the sealing face of the casing accomplishing the seal beyond said abraded section.

The same result is accomplished in the construction shown in Figures 11 to 16, the only difference between these figures and those shown in the illustrations, Figures 7 to 10, being that in the one case, the face of the sealing element 7 is formed with an annular bearing surface, whereas in the other, the surfaces are in the same plane as the surfaces of the interior of the casing with which they are adapted to cooperate.

In Figures 17 to 20, inclusive, instead of mounting the sealing element to move in the arc of a circle, it is mounted to reciprocate in a path perpendicular to the axis of the port. Figures 17 and 18 illustrates the valve as closed, and Figures 19 and 20 as partly open. In these figures, 15 is the valve stem which is secured at one of its ends to the sealing member 7' and provided at its opposite end with an operating hand wheel 16. The stem is mounted as shown at 17 and screws through a threaded part of the valve casing, so that rotation of the hand wheel will impart rectilinear movement to the sealing elements 7 and 7'. In all of the constructions illustrated in Figures 1 to 16, the sealing element is mounted on the arm 2 to move in the arc of a circle, as stated, and also for rotary movement on its own axis. Experience has demonstrated that, when the sealing element is moved by the arm 2 in the arc of a circle and is mounted to revolve on its own axis, the sealing element will also revolve on its own axis by reason of its frictional engagement with the sealing face of the valve casing, thus presenting at each revolution a different face to the periphery of the valve port. This of course would not be the case in the construction shown in Figures 17 to 20, where there is no rotation of the sealing element, but in the opening and the closing of the valve the same surface is presented to the edge of the valve port.

From the foregoing drawings, it will be manifest that where a valve casing is formed with a sealing face and a port passing through said casing, and a valve element is mounted to cooperate therewith, conditions will develop corresponding to those referred to generally in the statement of invention; that is to say, as the sealing element approaches final sealing engagement with the periphery of the valve port, a narrow aperture will be formed between said sealing element and said port, said aperture taking the form of a crescent, and when fluid or liquid carrying abrasive materials in suspension is forced through this crescent aperture, abrasion is liable to result to the peripheral edge of the port and the internal sealing face of the valve casing. With respect to the stationary parts, to wit, the port and the casing, this abrasion is constantly recurring at the same point, and it does also occur in the corresponding point in a valve where the valve element is moved in the path of a line passing through the axis of the port and the point of abrasion. But where the sealing element, as in the illustrations shown in Figures 1 to 16, is mounted to revolve on its own axis, this constant abrasion of the edge of the sealing element is not present, for the reason that with each arcuate movement of the arm 2, the sealing element is caused to revolve on its own axis by reason of its frictional engagement with the bearing surface of the casing; consequently, a new face of said sealing element is constantly presented in the operation of said rotary element.

Were this abrasion altogether on the sealing element, it would be possible to remove and replace the sealing element, but in the structures illustrated the abrasion occurs at the edge of the port which is part of the permanent valve casing. Consequently it would involve more difficulty and expense to replace the wall of the casing which is abraded, than it would to replace the removable valve element.

It is the purpose, as stated, of this invention not to prevent the abrasion above referred to but to provide means to compensate for such abrasion and thus extend the life of the valve by a material increment. This is accomplished in the instant case by forming that section of the internal valve faces adjacent the point of abrasion, as indicated at 10, with a wider face than that which is normally contemplated in valves as universally constructed, and as illustrated in the drawings 1 to 6.

In the drawings 1 to 6, the face indicated as 13 is relatively narrow as compared with the face indicated in the drawings 7 to 10 as 12. In like manner the sealing element in the drawings 1 to 6 is relatively of less diameter than the sealing element shown in Figures 7 to 10. In the normal construction as shown in Figures 1 to 6, when the sealing face 13 is sufficiently worn it will no longer present a sealing face corresponding with the sealing face 8 of the sealing element of those drawings, for the reason that the abrasion will have increased to such an extent as to leave an aperture between the sealing element and the sealing face. In the construction shown in Figures 7 to 10, the sealing face 12 being of greater dimension, and the sealing element being of greater diameter, the sealing element when moved to the position shown in Figures 7 and 8 will overlap such abraded section and cooperate with said wider sealing face to accomplish a seal therewith for a much longer period than would be possible with the construction shown in Figures 1 to 6.

This invention, therefore, contemplates the forming of a valve with a sealing face adjacent the point of abrasion, as stated, of greater area than that heretofore employed. It also contemplates forming the sealing element of a greater diameter than that formerly employed in this type of valve, so that, notwithstanding such inevitable abrasion due to the formation of the crescent aperture with the opening and closing of the valve, still by moving the sealing element beyond such abraded point onto a field or surface adapted to cooperate with the sealing element beyond such abraded point, the usefulness of the valve may be materially increased without the necessity of unlimbering the casing and restoring those surfaces which have been abraded, as indicated at 10.

As previously stated the abrasion of the sealing element is not noticeable for the reason that it is not seriously affected by such abrasion because of the fact that it is mounted to move on its own axis, but this is not true with reference to the structure shown in Figures 17 to 20, where the sealing element is not permitted a rotary movement but is caused to pass over the port in a line passing through the axis of said port and the point where the periphery of the port is abraded. Consequently in such case the point of abrasion of the periphery of the port and the point of abrasion of the sealing elements are the same; but where the internal face of the casing is made of sufficient width adjacent the point of abrasion, the valve element can be moved over the abraded section and form a seal with such surface beyond the abraded section, and thus accomplish the result desired and pointed out in this application.

This invention particularly contemplates placing the sealing element eccentric to the port in the closed position, so that maximum overlap of the port at the point of greatest wear on the port face may be accomplished with minimum size or diameter of sealing element.

This latter feature (minimum size of sealing element) is particularly desirable, as, the larger the diameter of the sealing element is the greater is the resistance to the operation of the valve under pressure, and the greater the diameter of the sealing element the greater is the pressure between sealing element and sealing face due to the fluid pressure and consequently the greater becomes the wear of the surfaces as the sealing element is slid over the face to open or close the valve.

Claims:—

1. In a gate valve, a valve casing with a port opening therethrough and a valve sealing face circumferential to said port, a sealing element mounted to cooperate with said sealing face and said port to accomplish a closure of the port, and means to operate said sealing element, said sealing face, adjacent a point in the circumference of said port where in opening or closing the valve the edge of the sealing element and the edge of said port meet to first open or finally seal said port, being extended in the same plane a predetermined distance to allow for the accomplishment of a seal between said sealing face and said sealing element a predetermined distance beyond said point on the periphery of said port, said sealing element being of a size to embrace said port and accomplish a seal with said sealing face circumferential of said port and including said extended area, and the means for operating said sealing element being such as to move said sealing element a predetermined distance in opening or closing the port sufficient to allow for movement over the area of said extended sealing face so that when said sealing element is moved to cover said port its movement is further extended to embrace said extended area of said sealing face a predetermined dimension, and thus embrace not only said port but said extended area of said sealing face so as to accomplish a seal circumferential of the port and including said extended area of said sealing face.

2. In a gate valve, a valve casing with a port opening therethrough, and a valve sealing face circumferential to said port, a sealing element mounted for arcuate movement and also mounted for rotation on its axis, said sealing element adapted to cooperate with said sealing face and said port to accomplish a closure of the port, and means to operate said sealing element, said sealing face, adjacent a point in the circumference of said port where in opening or closing the valve the edge of said sealing element and the edge of said port meet to first open or finally seal said port, being extended in the same plane a predetermined distance to allow for the accomplishment of a seal between said sealing face and said sealing element a predetermined distance beyond said point on the periphery of the said port, said sealing element being of a size to embrace said port and accomplish a seal with said sealing face circumferential of said port and including said extended area, and the means for operating said sealing element being such as to move said sealing element a predetermined distance in opening or closing the port sufficient to allow for movement over the area of said extended sealing face so that when said sealing element is moved to cover said port its movement is further extended to embrace said extended area of said sealing face a predetermined dimension, and thus embrace not only said port but said extended area of said sealing face so as to accomplish a seal circumferential of the port and including said extended area of said sealing face.

3. In a gate valve, a valve casing with a port opening therethrough, and a valve sealing face circumferential to said port, a sealing element mounted for arcuate movement and also mounted for rotation on its axis, said sealing element adapted to cooperate with said sealing face and said port to accomplish a closure of the port, and means to operate said sealing element, said sealing element being also provided with annular bearing surface of greater internal diameter than that of the port, said sealing face, adjacent a point in the circumference of the said port where in opening or closing the valve the edge of said annular sealing face of said sealing element and the edge of said port meet to first open or finally seal said port, being extended in the same plane a predetermined distance to allow for the accomplishment of a seal between said sealing face and said sealing element a predetermined distance beyond said point on the periphery of said port, said annular sealing face of said sealing element being of a size to embrace said port, and also said extended portion of said sealing face, the means for operating said sealing element being such as to move such sealing element a predetermined distance in opening or closing the port sufficient to allow for the movement of the said annular sealing face over the said extended area so that when said sealing element is moved to cover said port and said area to close the port, it is eccentric to the axis of the port by a predetermined dimension, but the relation of the parts being such that such annular bearing surface of the sealing element will embrace the port and also said extended area of said sealing face so as to accomplish a seal circumferential of said port but eccentric thereto.

4. In a valve comprising a port having a sealing face and a sealing element adapted to slide across the port and cooperate with said sealing face to form a seal, means for moving the sealing element over the port and past the center of said port to a point where the sealing element overlaps said port by a predetermined amount, which will bring the sealing element into a position where it will overlap the port a definitely greater amount on one side of the port than it does on the opposite side of the port.

5. In a valve comprising a port having a sealing face and a sealing element adapted to slide across the port and cooperate with said sealing face to form a seal, means for moving the sealing element over the port and past the center of said port to a point where the sealing element overlaps said port by a predetermined amount, which will bring the sealing element into a position where it will overlap the port a definitely greater amount on one side of the port than it does on the opposite side of the port, said sealing face around the port being extended on that side of the port to cooperate with the greater overlap of the sealing element as described.

Signed by me at Jersey City this 25th day of March 1925.

WYLIE G. WILSON.